(12) United States Patent
Reed (10) Patent No.: US 6,753,030 B2
(45) Date of Patent: Jun. 22, 2004

(54) METHOD FOR SHAPING AND MOLDING MATERIALS

(76) Inventor: Cathy J. Reed, 8 Shady Hill Rd., Nashua, NH (US) 03063

( * ) Notice: Subject to any disclaimer, the term of this patent is extended or adjusted under 35 U.S.C. 154(b) by 49 days.

(21) Appl. No.: 10/301,970

(22) Filed: Nov. 22, 2002

(65) Prior Publication Data

US 2003/0072860 A1 Apr. 17, 2003

Related U.S. Application Data

(62) Division of application No. 09/552,361, filed on Apr. 19, 2000, now Pat. No. 6,505,809.

(51) Int. Cl.[7] .................................................. A23P 1/00
(52) U.S. Cl. ..................... 426/505; 249/163; 426/515
(58) Field of Search .................. 426/505, 515; 264/163; 249/95, 97, 129, 131, 163, 168, 170

(56) References Cited

U.S. PATENT DOCUMENTS 3,128,724 A * 4/1964 Linder ........................ 249/102
4,452,419 A * 6/1984 Saleeba ..................... 249/53 R

* cited by examiner

*Primary Examiner*—George C. Yeung
(74) *Attorney, Agent, or Firm*—Robert R. Deleault, Esq.; Mesmer & Deleault, PLLC (57) ABSTRACT

An apparatus and method for shaping and molding material having two sidewalls, two end walls, a bottom and at least one partition. The two sidewalls have grooves spaced at predetermined intervals on an inside surface for receiving a partition and a bottom ledge for retaining the bottom. The inside surface has a plurality of openings sized for receiving holding members and may have a variety of shapes. The bottom is shaped to mate with the shape of the inside surface of the sidewalls. The two end walls include locking mechanisms for holding the various components of the apparatus together.

6 Claims, 7 Drawing Sheets

METHOD FOR SHAPING AND MOLDING MATERIALS

This application is a divisional application of application Ser. No. 09/552,361, filed on Apr. 19, 2000, now U.S. Pat. No. 6,505,809.

BACKGROUND OF THE INVENTION

1. Field of the Invention

The present invention relates to a container for shaping and molding materials. More particularly, the present invention relates to a pan designed to create various shapes or molds of a particular material.

2. Description of the Prior Art

Cooking pans have been designed to mold cooking edibles into conventional shapes, such as square, rectangle and circle designs. Molded material, even when in conventional shapes is often difficult to remove. Some pans have been improved to include removable walls to assist removal of a baked product. Acknowledging the fact that molding baking materials was very time consuming, some companies reverted to using baking pans with removable walls. A baking pan assembly is illustrated by U.S. Pat. No. 4,644,858 (1987, Liotto et al.). The baking pan is designed to have removable sides and bottom. The circular half sections are pinned or clamped together at the ends holding a circular base that fits in an annular groove. After the food product is baked, the half sections are detached from the base to expose the product. Another pan with removable sections is illustrated with a multiple-purpose cake pan by U.S. Pat. No. 5,537,917 (1996, Schiffer et al.). The cake pan has a removable insert that slides out from the outer rim of the cake pan. A tube cake insert molds the inner hole of a tube cake. Unfortunately, these pans may only be used for circular shapes. The baking pans do not address baking multiple pieces or even unconventional shapes.

Some pans have been improved to include removable walls to vary the width of the pan. A multi-purpose baking pan with hinged end sections and cover is illustrated by U.S. Pat. No. 5,779,080 (1998, Corse). The pan has a rectangular bottom with two linear sidewalls on opposite edges along the long sides of the rectangular bottom. Two end members are at the short sides of the rectangular bottom having rod-like hinge pins. The pan is also illustrated having a rectangular pan and a divider for varying the size of the two areas. The pan is only good for varying the portions of the two rectangular sections. The pan does not address unconventional shapes or molding more than two sections.

Other pans have been improved to include surface contours to mold distinctive shapes in one or more of the pan walls. A method of making controlled heating baking pan is illustrated by U.S. Pat. No. 5,094,706 (1992, Howe). The pan may be made to have distinctive surface contours pressed or formed on the wall portions for molding designs in the materials.

Repetition in molding or forming multiple pieces is labor intensive and cost consuming. To mold or shape materials, the material must be cut into the desired shape before or after cooking or setting the materials. For example, a baker uses cookie cutters to cut dough before baking the cookies or cuts a triangular slice of circular pizza pie after baking a circle shape. Forming the material to the desired shape takes skill and time, whereas cutting the material creates undesired waste. Some companies have manufactured multiple molding units to save time. A baking pan having multiple baking units is illustrated by U.S. Pat. No. 4,941,585 (1990, Hare et al.). The problem with the prior art multiple unit baking pans is that the material must be measured out and poured into each mold separately. This process is slow and labor intensive. Additionally, the manual method of measuring out the material seldom provides uniform pieces. Furthermore, these multiple unit baking pans have the same repeating shape and the pan must be inverted to remove the material from the pan.

SUMMARY OF THE INVENTION

It is therefore an object of the present invention to provide an apparatus that is capable of molding and forming multiple, uniform or variable pieces within one assembly. It is another object of the present invention to provide an apparatus that enables the removal of the finished goods without inverting the apparatus, which may cause damage to the goods. It is still another object of the present invention to provide a device that allows high packing density of odd shapes. It is yet another object of the present invention to provide a device that is fully capable of being broken down to improve the effectiveness of cleaning and to reduce storage space. It is yet another object of the present invention to provide an apparatus that is capable of being used in a conventional or microwave oven. It is yet another object of the present invention to provide an apparatus that is capable of producing goods with uniform shapes and thickness. It is yet another object of the present invention to provide an apparatus that is capable of inserting a stick or handle to the material being molded or baked prior to baking/molding.

The present invention achieves these and other objectives by providing a device that is capable of shaping and molding material. The present invention is an apparatus for shaping and molding material comprising two sidewalls, two end walls, a bottom plate and one or more partitions. The inside surface of the two sidewalls has one or more grooves or slots spaced along the inside surface at predetermined intervals. One of the side walls, i.e. the first sidewall, has one or more surface portions on its inside surface and the inside surface of the other side wall, i.e. the second sidewall, has at least one more surface portion than the inside surface of the first side wall. For example, if first sidewall has two surface portions, then second sidewall has at least three surface portions. The sidewalls also have a bottom ledge or shelf extending out from the inside surface. Additionally, the sidewalls have one or more apertures or holes positioned adjacent to the grooves or slots that extend through the given side wall where the aperture(s) or hole(s) is located. For example, a hole may be placed between two adjacent grooves or between a groove and the end wall.

The end walls are removably attached between the ends of the sidewalls. The connection between a side wall and end wall may be attached using a pinned connection, a latch, band, tongue and groove, etc. The bottom plate has a side edge that conforms to the inside surface of the sidewalls. For example, if the inside surface of the sidewalls had multiple arc shapes, then the bottom plate would conform to those arc shapes. One or more partitions are used to divide the material in the pan into smaller shapes. A given partition is sized to slide into the grooves or slots between the two sidewalls. The partition may be single piece for sliding into two opposed grooves or the partition may be a single, continuous piece formed to slide into a multiple of opposed grooves so that only one partition is used to make a plurality of product pieces. If more than one partition is used, two partitions may be inserted into one groove creating a triangular effect between the sidewalls. The partitions may be single-walled or double-walled. The double-walled design may help distribute heat to the material in the pan that requires cooking such as a cake. The double-walled design is also helpful when cooling the material in the pan when chilling is required such as when making flavored gelatin or molding ice cream and the like.

The bottom plate may be flat, indented to form a "character face" or other design, or have inverted domes that align with the partitions and grooves to create a one-half cone shape. The present invention may also include a bottom support. The bottom support prevents the bottom plate from dropping when disassembling the pan.

The sidewalls may have multiple embodiments. For instance, one embodiment may have a sidewall with an array of notches spaced at predetermined intervals with a top plate that has an array of matching protrusions spaced at the same predetermined intervals as the notches. Mating of the notches and protrusions of the sidewall and the top plate forms the apertures previously mentioned. This arrangement allows removal of the finished unit on a stick by first removing the top plate, end walls, then pulling out the sidewalls and removing the stick from the notch. A block attached to the top plate may also be sized for plugging the notches not needed in a given arrangement. A second embodiment would also have the notches and protrusions, however, the sidewall is a two piece sidewall where each piece has matching inside surfaces.

In one embodiment of the present invention the apparatus also includes a lid section that may be placed over the pan, resting on the sidewalls and end walls. The lid is used to cover the material in the pan for shaping the material. Additionally, the lid aids in stacking multiple pans, one on top of the other. Stacking increases the efficiency when baking goods in a commercial oven. The lid may also include one or more design shaping molds affixed to one side. When the lid is placed over the material being shaped or molded, the design-shaping mold on the lid presses into the material. This mold on the lid adds ornamental designs to the surface of the material. The lid section may also include one or more apertures. A stick or handle to hold the molded piece may be added by inserting it through the aperture in the lid. Once the molded piece is set, the stick is affixed to the material providing the handle.

The device may also include one or more handles attached to one or more of the side walls, the first end wall, the second end wall, the bottom plate, or the partition pieces. Handles may be shaped like a cylindrical rod, a U-shaped bar, a plate structure, etc. The handles make it easier to assemble or disassemble the pan and to remove the finished product.

Another embodiment of the present invention may further comprise an inside surface that has one or more shaping contours spaced adjacent to the grooves. The shaping contours may include, but is not limited to, an arch shape design, tree shape design, etc. In addition, if an arch shape design is used, the arch shape may have a radius that is substantially equal to a given partition. Arch shape designs may be arranged so that the final product looks as if the pieces were cut from a circle.

Another embodiment includes a pivot between the walls to assist in assembly and disassembly of the pan. In this arrangement the first end wall is pivotally attached to one end of a sidewall. The second end wall may also be pivotally attached to the end of a sidewall. When the pan is disassembled, the end walls would remain attached to the sidewalls with the pivots. When reassembling the pan, the end walls are rotated into place against the opposite sidewall and then latched at that end to complete the assembly of the pan. The pivot minimizes the time and skill required reassembling the pan.

To prevent the bottom plate from dropping during disassembly of the pan, another embodiment provides a bottom plate comprising a first section that conforms to the inside surface of the side walls and a second section that is substantially the same thickness as the bottom ledge of the side walls. The first section is removably attached to the second section. In the alternative, the bottom plate may comprise a first section that conforms to the inside surface of the sidewalls and a second section that is greater than the thickness of the bottom ledge of the sidewalls. This way the first section is also removably attached to the second section, but the second section extends under the sidewalls to add further stability to the pan.

Another embodiment of the present invention may further provide the aperture in the sidewall designed so as to accommodate at least one elongated holding member. The elongated holding member may include, for example, a stick, a rod, a handle, a bar, a tube, etc. The holding member may be made from a variety of different materials, for example, wood, metal, ceramic, plastic, etc. Additionally, the side wall thickness is designed to hold the elongated holding member at a fixed angle or parallel to the bottom plate when inserted through the aperture and into the material. One or more of the apertures may also be sized to match at least one elongated holding member. For example, the aperture may be designed to match the holding member by having a shape of a square, a rectangle, a triangle, a circle, a star, a polygon, a crescent, an oval and the like.

When an aperture is not required and holding members are not desired in the material, a plug sized to fit into the apertures may be used. Thus, an aperture may be plugged when a holding member is not placed in a given aperture.

To use the pan after assembly, one would start by spreading or pouring a material into the pan. After evenly spreading the material, at least one partition is inserted into the pan by sliding the partition into two opposed notches in the sidewalls. By pushing the partition until it contacts the bottom of the pan, the material is separated into portions. As many partitions may be inserted into the pan as there exists opposing grooves. It should be noted that the partitions need not be the same shape. Finally, one or more sticks are inserted through a similar number of apertures in the sidewalls and into the material. An alternative is to insert the sticks through the apertures before adding the material to the present invention.

After the partitions and sticks have been inserted in the pan, a lid may be placed over the pan. This would allow the pans to be stacked and protect the finished goods. Stacking pans optimizes the use of space whether on a table, counter, or an oven, refrigerator or baker's shelves. The lid may also have at least one opening to allow placing at least one elongated holding member through the lid into the material or mixture. The holding member may be placed through apertures in the sidewalls and/or in the lid. This option allows the design of a piece being set to have a holding member hold the piece in a vertical or horizontal plane. The lid may also have at least one design-shaping mold affixed to the inside portion of the lid that would be pressed into the mixture. Character features and other designs may be placed in the material being set.

Further objects and advantages of this invention will be more clearly apparent during the course of the following description, references being had to the accompanying

DETAILED DESCRIPTION OF THE PREFERRED EMBODIMENT

For the purposes of promoting an understanding of the principles of the invention, references will now be made to the preferred embodiment of the present invention as illustrated in FIGS. 1–7, and specific language used to describe the same. It will nevertheless be understood that no limitation of the scope of the invention is thereby intended. The terminology used herein is for the purpose of description and not limitation. Any modifications or variations in the depicted method or device, and such further applications of the principles of the invention as illustrated therein being contemplated as would normally occur to one skilled in the art to which the invention relates.

Figure 1:
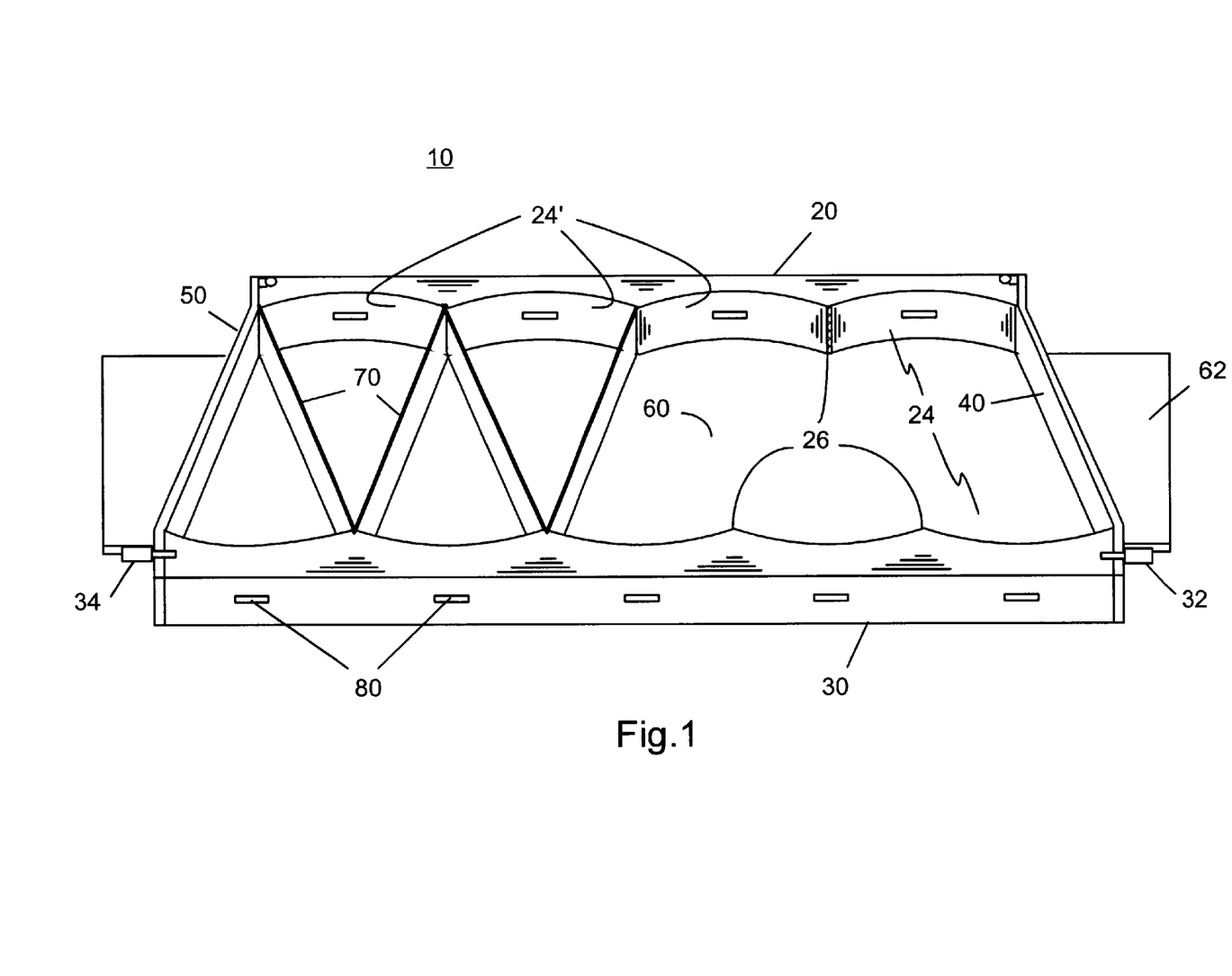
FIG. 1 is a perspective view of an apparatus for shaping and molding material that is constructed in accordance with the present invention.

Referring now to FIG. 1, there is shown a perspective view of a container or pan 10 having a first side wall 20, a second side wall 30, a first end wall 40, a second end wall 50, and a bottom plate 60. Container 10 is arranged so that the sidewalls 20 and 30 are opposite each other. Sidewalls 20 and 30 have partition channels 26 at spaced intervals along their inside surfaces 24. Inside surface 24 of sidewall 20 has one or more surface portions 24'. Inside surface 24 of sidewall 30 has one more surface portion 24' than the number of surface portions 24' on sidewall 20. First end wall 40 and second end wall 50 are designed to form a snug fit between sidewalls 20 and 30 and are held in place by latch mechanisms 32 and 34, respectively. Bottom plate 60 interfaces with the sidewalls 20 and 30 and first end wall 40 and second end wall 50 to complete container 10. Partitions 70 are arranged between the sidewalls 20 and 30 to section off individual compartments within container 10. A hole or aperture 80 is placed in side walls 20 and 30 between partition channels 26 or between a partition channel 26 and a first end wall 50 or second end wall 60. Also shown is bottom support 62 that supports bottom plate 60 during disassembly so as to prevent bottom plate 60 and the molded material within container 10 from falling and wedging the sticks if used.

Figure 2:
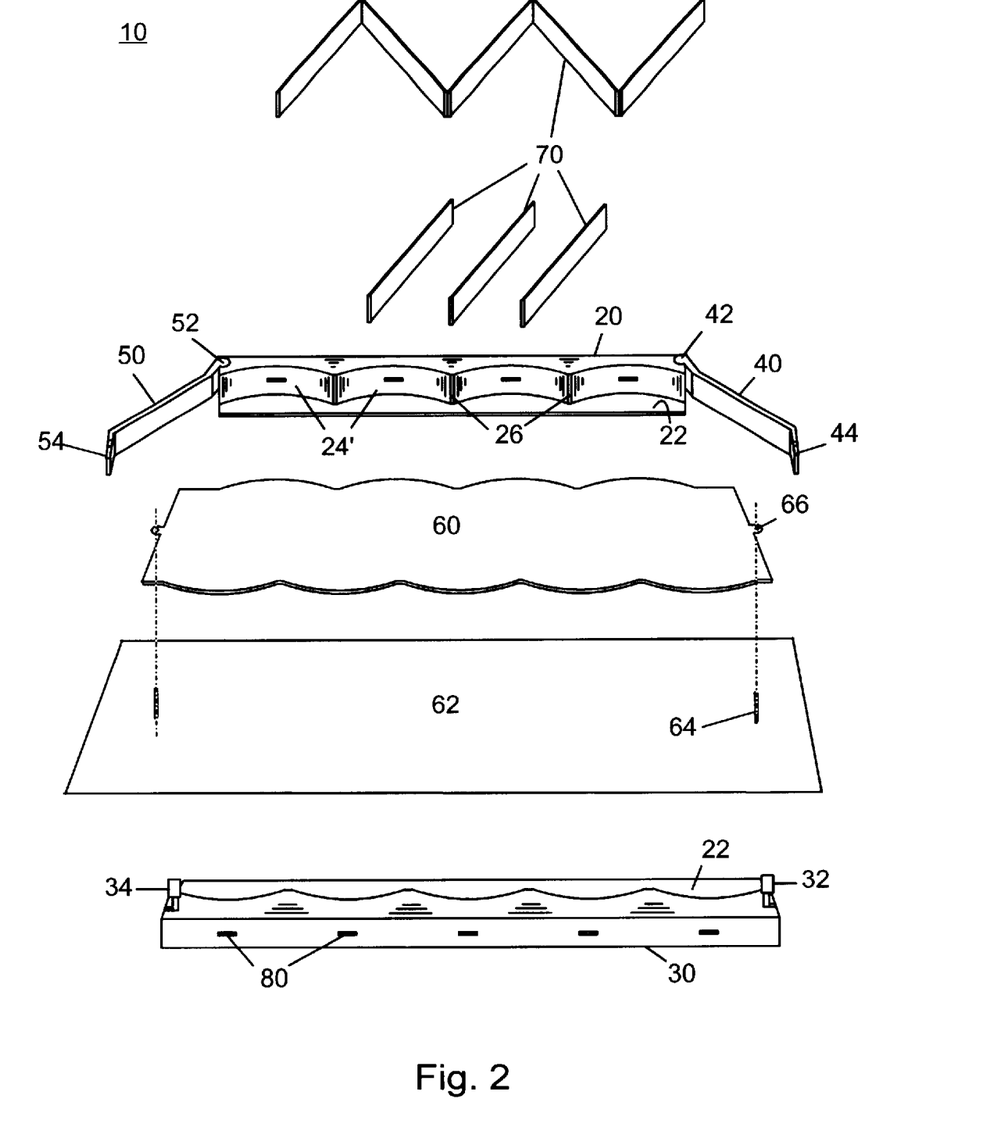
FIG. 2 is a perspective, exploded view of the apparatus in FIG. 1.
Figures 2A, 2B:
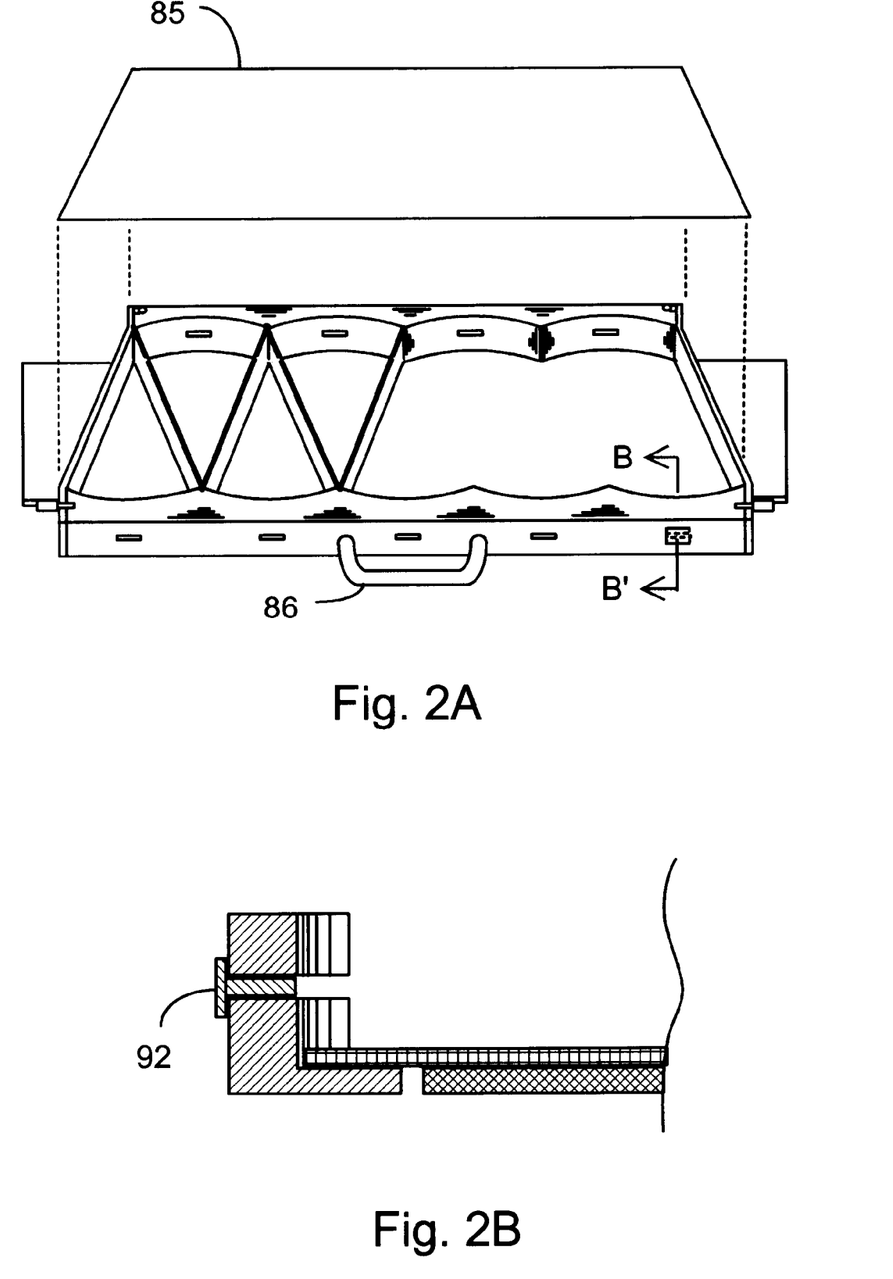
FIG. 2A is a perspective view of the present invention showing a lid.
FIG. 2B is a cross-sectional view of the aperture portion of the present invention showing a plug in the aperture.

Turning now to FIG. 2, there is illustrated container 10 in exploded view to show the individual components. First sidewall 20 and second sidewall 30 have a bottom ledge 22. Bottom ledge 22 is designed to support bottom plate 60 when container 10 is assembled. Bottom ledge 22 must be strong enough to hold bottom plate 60 in place as well as any baking or molding material placed inside of container 10. Sidewalls 20 and 30 also have inside surface 24 found along the inner wall of the container 10. Inside surface 24 may be flat or have a scalloped surface as illustrated. Inside surface 24 may also have a variety of different molding shapes, depending on the effect one wishes to create. FIG. 2A shows a lid or cover 85 sized to fit over pan 10. Cover 85 is supported by sidewalls 20, 30 and end walls 40, 50. A handle 86 may optionally be affixed to sidewalls 20 and/or 30 to facilitate handling of pan 10. FIG. 2B is a cross-section along line B–B' in FIG. 2A. Plug element 92 is used to fill aperture 80 when a holding member is not used. Plug element 92 may have any structure provided that it plugs or fills aperture 80 to prevent any material placed within pan 10 does not leak out of an aperture 80 that does not have a holding member therein.

Grooves or notches 26 are located between sections of inside surface 24. Grooves 26 are preferably placed along inside surface 24 at evenly spaced intervals. However, the spaced intervals may be uneven depending on a given mold design. Apertures 80 are located between grooves 26 or between a groove 26 and first end wall 40 or second end wall 50. Partitions 70 are placed between the sidewalls 20 and 30, and fit into opposed grooves 26. Grooves 26 are offset on opposing sidewalls 20 and 30 so that any two adjacent partitions 70 would generally form a "V" shape.

The bottom plate 60 is shaped to match inside surface 24 of sidewalls 20 and 30. In this way, bottom plate 60 forms a good fit with sidewalls 20 and 30 to retain the material placed into container 10. The illustration also shows a detachable bottom support 62. Bottom support 62 is designed to fit underneath bottom plate 60 in the space between bottom ledges 22 of sidewalls 20 and 30. However, bottom support 62 is not needed until the finished product is complete and the material is to be removed from pan 10.

When the pan 10 is disassembled, locking mechanism 32 and 34 are unlatched so that first end wall 40 and second end wall 50 may be removed. Sidewalls 20 and 30 are then pulled out away from the bottom plate 60. Bottom support 62 prevents bottom plate 60 from dropping during the disassembly process, which prevents the stick, if used, from wedging and causing the molded material from breaking up. Bottom support 62 is connected to the bottom plate 60 by way of an alignment pin 64 spaced from each end of bottom support 62. Alignment pin 64 fits into a corresponding hole 66 located on each end of the bottom plate 60. It should be understood that the use of alignment pin 64 is not necessary, nor is hole 66 required in bottom plate 60. The use of these features simply makes using pan 10 a little easier. Bottom support 62 and bottom plate 60 may also be made or combined to form one bottom plate 60. For example, bottom plate 60 may be constructed as a one-piece unit or two-pieces integrally formed. Bottom plate 60 may be machined, molded or cast.

First end wall 40 and second end wall 50 are hingedly attached to first sidewall 20 in this illustration of the present invention at hinged connections 42 and 52. Hinged connections 42 and 52 make it relatively easy for a user to assemble container 10. Using an embodiment that does not have first end wall 40 and second end wall 50 pivotally attached to first side wall 20 or second side wall 30 requires a user to fit the parts together in a skillful manner (like a puzzle). Opposite ends 44 and 54 of first end wall 40 and second end wall 50 are connected to the second side wall 30 using latched connections 32 and 34. Latched connections 32 and 34 hold the side walls 20 and 30, first end wall 40, second end wall 50, and bottom plate 60 together to make container 10.

Figure 3:
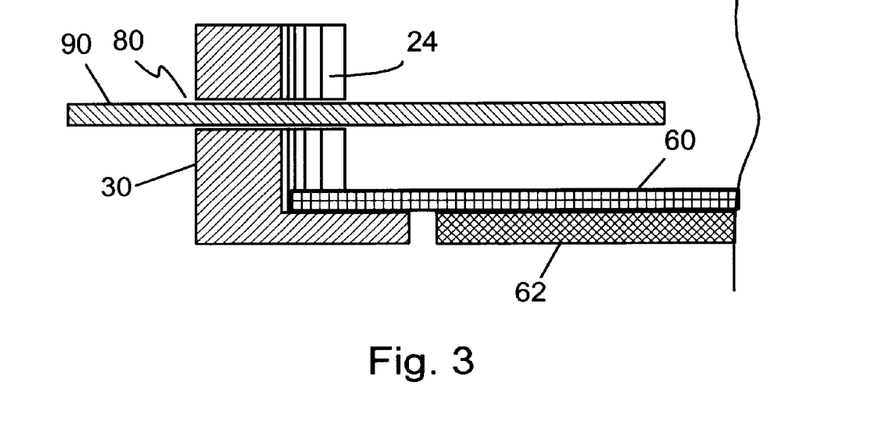
FIG. 3 is a cross-sectional view of the present invention showing a holding member held in place through an aperture in the sidewall.

Referring to FIG. 3, a cross-section of container 10 is illustrated showing sidewall 30 and bottom plate 60. Aperture 80 extends through sidewall 30 and is positioned between two grooves 26 (not shown). Aperture 80 is sized to accommodate a holding member 90 in a horizontal position in container 10 while the material solidifies. The holding member 90 may be a stick, a bar, a tube, or any device used to insert into the material and to hold the material onto holding member 90. Wooden tongue depressors or craft sticks are examples of useable devices for holding member 90.

Figure 4:
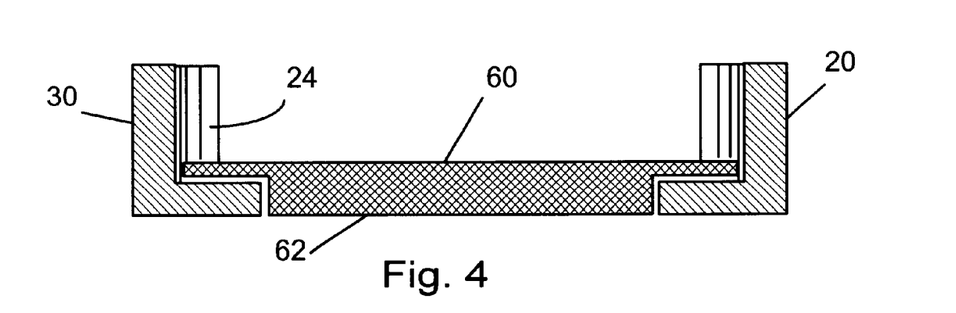
FIG. 4 is a cross-sectional view of one embodiment of the bottom plate of the present invention.

Referring to FIG. 4, there is illustrated a cross-sectional view of another embodiment of bottom plate 60. This embodiment shows bottom plate 60 as having a lower section 62. Bottom plate 60 with lower section 62 may be a unitary piece that is molded or cast as one piece or an integral piece where lower section 62 is attached to bottom plate 60. This embodiment of bottom plate 60 also prevents bottom plate 60 from falling during disassembly and helps prevent the molded material from breaking up.

Figure 5:
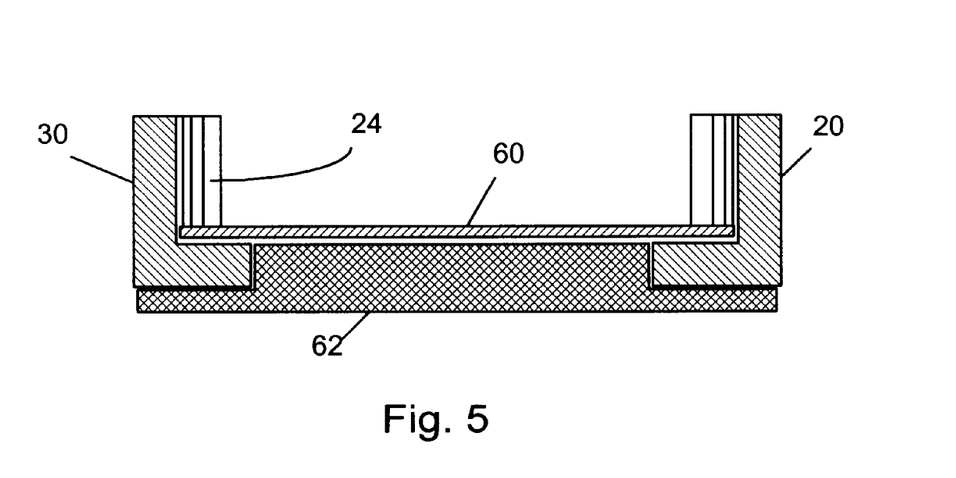
FIG. 5 is a cross-sectional view of another embodiment of the bottom plate of the present invention.

Referring now to FIG. 5, there is shown a cross-sectional view of another embodiment of lower section 62. This embodiment shows lower section 62 not only supporting bottom plate 60 but also supporting first sidewall 20 and second sidewall 30. This design gives container 10 more stability.

Figure 6:
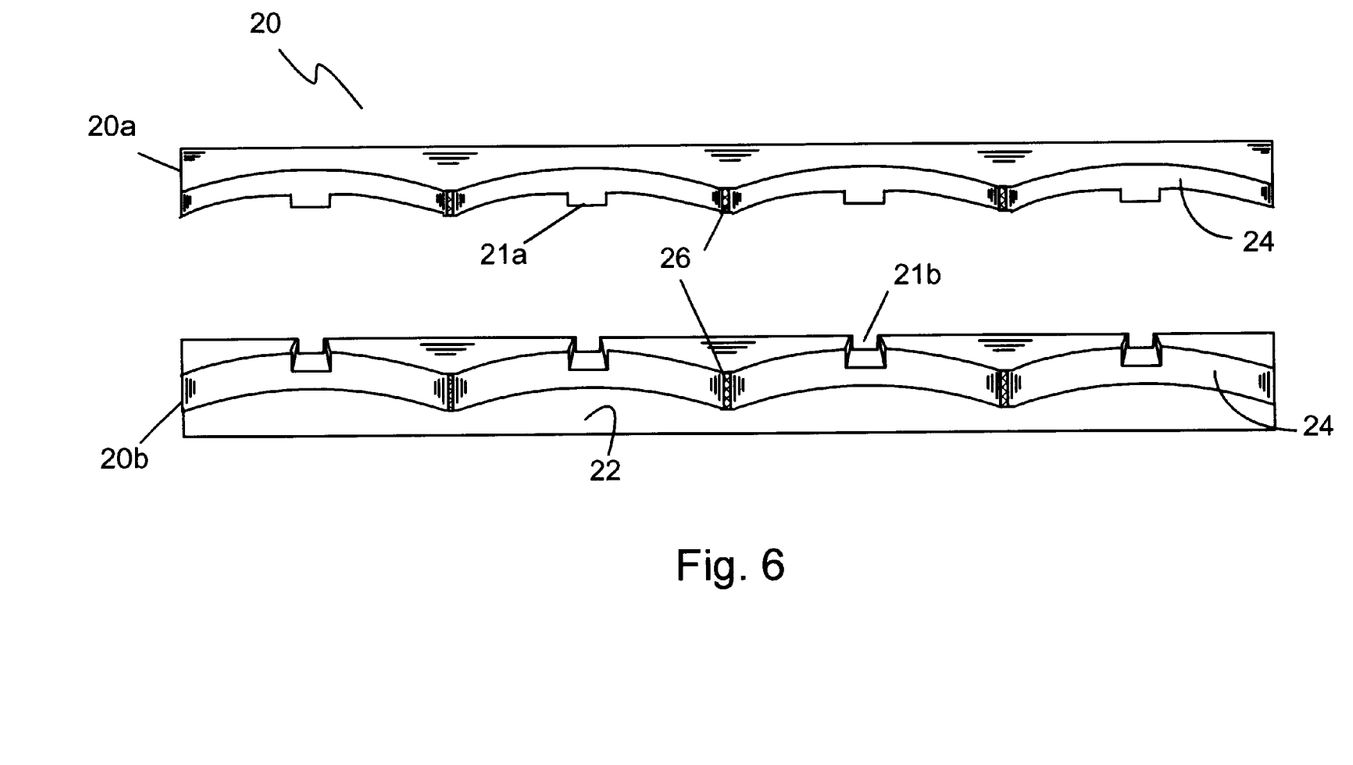
FIG. 6 is a perspective view of another embodiment of the sidewall of the present invention having two sections that form the apertures when assembled.

Referring now to FIG. 6, there is shown another embodiment of first sidewall 20 and second sidewall 30 of the present invention. First sidewall 20 is shown having two sections, top section 20a and bottom section 20b. Top section 20a has an array of spaced protrusions 21a and bottom section 20b has an array of spaced recesses 21b that fit together like a puzzle to form sidewall 20. When top section 20a and bottom section 20b are fitted together, protrusions 21a and recesses 21b form aperture 80. This embodiment of sidewall 20 allows a molded material having a handle to be more easily removed from container 10. Top section 20a and bottom section 20b may be held together by any convention means, particularly by means that allows for easy assembly and disassembly. It should be understood that top section 20a and bottom section 20b may both have matching recesses sized to form aperture 80, or top section 20a may be flat with bottom section 20b having recesses sized to form aperture 80 when top section 20a is joined to bottom section 20b.

Figure 7:
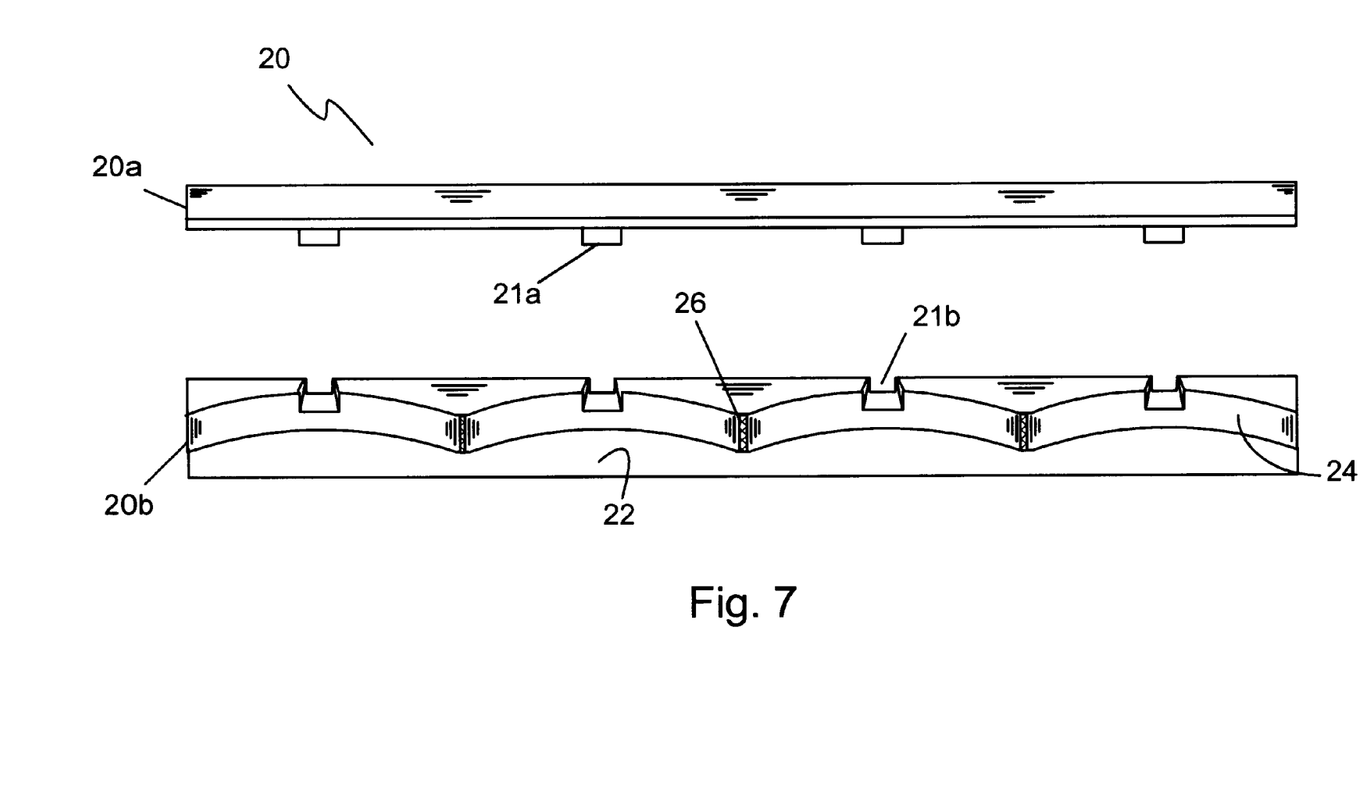
FIG. 7 is a perspective view of another embodiment of the side wall of the present invention having two sections where one section is a top plate with downwardly extending blocks.

FIG. 7 shows another embodiment of first sidewall 20. In this embodiment, top section 20a is a top plate with an array of spaced protrusions 21a. Bottom section 20b has an array of spaced recesses 21b. The difference is that bottom section 20b is the full depth of container 10 and that top section 20a does not have a matching inside surface 24 like bottom section 20b. As in the previous embodiment, protrusions 21a and recesses 21b form a plurality of apertures 80 when top section 20a is fitted to bottom section 20b.

Figure 8:
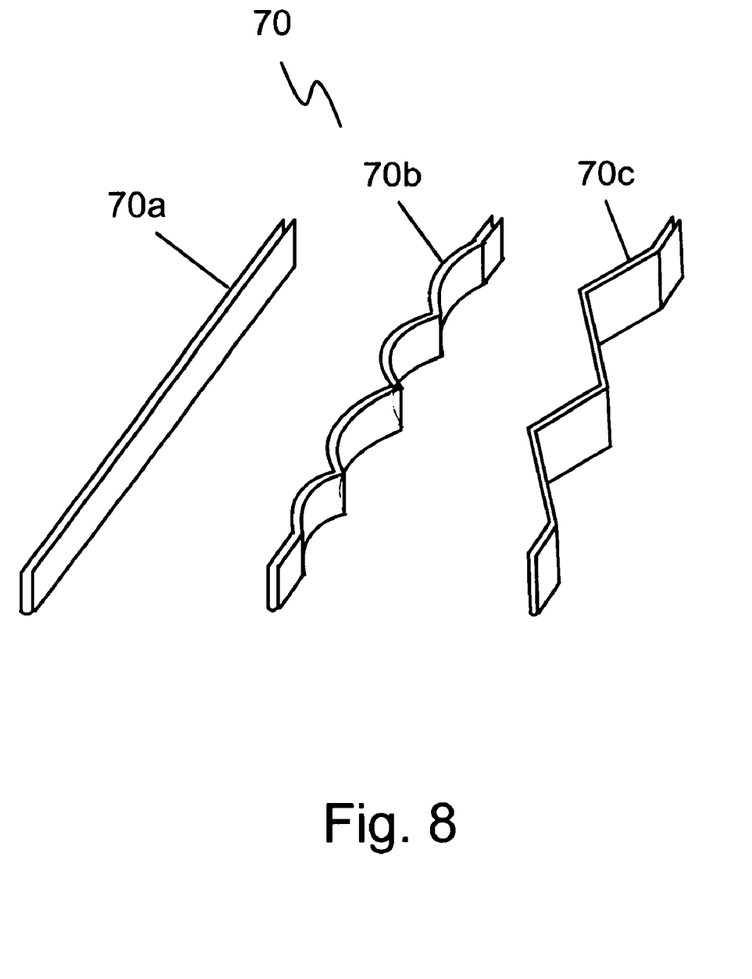
FIG. 8 is a perspective view of various embodiments of the partitions used in the present invention.

Referring now to FIG. 8, there is shown several different embodiments of partition 70 that can be used with the present invention. Partition 70a is shown as being a straight piece that can be inserted into two opposing grooves 26 of container 10. Partition 70b is shown having a scalloped design that may give the molded material the shape of a tree. Partition 70c is shown having a connected "V" shape. Any number of shapes and designs may be made and used to give the molded material the desired look. As previously stated, partition 70a, 70b and 70c may be double-walled in order to provide more consistent heating or cooling to the individual portions in container 10. Further, partition 70 may be created as a single piece forming multiple partitions where a plurality of apexes slide into a plurality of corresponding grooves 26 when placed into pan 10. The component parts of pan 10 may also be coated with anti-stick material to prevent the finished product from adhering to pan 10.

Although a specific form of the invention has been illustrated and described, it will be apparent that various modifications can be made without departing from the spirit and scope of the invention.

What is claimed is:

1. A method of shaping or molding material comprising:
    obtaining a pan having a first side wall and a second side wall wherein each of said side walls has an inside surface with one or more grooves spaced at predetermined intervals along said inside surface forming surface portions wherein one or more grooves of said second wall are offset from said one or more grooves of said first side wall;
    disposing a material evenly into said pan; and
    inserting at least one partition into opposed grooves wherein said at least one partition divides said material into material portions.

2. The method of claim 1 further comprising inserting a holding member through an opening spaced from said one or more grooves and into said material wherein a portion of said holding member is protruding outside of said pan.

3. The method of claim 1 further comprising placing a lid over said pan.

4. A method of making wedge-shaped, edible food comprising:
    disposing a spreadable food substance within a container having a first side and a second side opposite said first side wherein each of said sides has at least one spaced groove on an inside surface transverse to said side wherein said at least one spaced groove of said first side is offset from said at least one spaced groove of said second side;
    inserting at least one partition sized to fit into said at least one spaced groove between said first side and said second side; and
    exposing said food substance to predefined conditions wherein said food substance solidifies.

5. The method of claim 4 further comprising inserting a holding member through an opening spaced from said one or more grooves and into said material wherein a portion of said holding member is protruding outside of said pan.

6. The method of claim 4 further comprising placing a lid over said pan.

* * * * *